United States Patent
Drasovean et al.

(10) Patent No.: US 9,279,714 B2
(45) Date of Patent: Mar. 8, 2016

(54) AUTOMOBILE SUBASSEMBLY FLUID FILL CONFIRMATION

(71) Applicant: Toyota Motor Engineering & Manufacturing North America, Inc., Erlanger, KY (US)

(72) Inventors: Leontin Drasovean, London (CA); Han Xu, Freemont, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 183 days.

(21) Appl. No.: 14/197,454

(22) Filed: Mar. 5, 2014

(65) Prior Publication Data

US 2015/0253180 A1    Sep. 10, 2015

(51) Int. Cl.
*G01G 17/04*    (2006.01)
*G01G 15/00*    (2006.01)
*G01M 13/02*    (2006.01)

(52) U.S. Cl.
CPC ............... *G01G 17/04* (2013.01); *G01G 15/00* (2013.01); *G01M 13/02* (2013.01)

(58) Field of Classification Search
CPC .. G01G 11/00–11/20; G01G 15/00–2015/047; G01G 17/04; G01M 13/02
See application file for complete search history.

(56) References Cited

U.S. PATENT DOCUMENTS

| | | | | |
|---|---|---|---|---|
| 4,494,583 A * | 1/1985 | Reeves, Jr. | ................ | B65B 3/28 |
| | | | | 141/168 |
| 4,788,856 A * | 12/1988 | Felger | ................ | G01M 13/025 |
| | | | | 73/115.06 |
| 5,072,797 A * | 12/1991 | Hughes | ................ | G01G 15/00 |
| | | | | 177/145 |
| 5,210,769 A * | 5/1993 | Seidel | ................ | G01F 23/246 |
| | | | | 340/450 |
| 5,434,366 A * | 7/1995 | Troisi | ................ | G01G 15/00 |
| | | | | 177/145 |
| 5,806,287 A * | 9/1998 | Trechsel | ............. | G01G 15/001 |
| | | | | 177/52 |
| 6,389,888 B1 * | 5/2002 | Juranitch | ............ | G01M 13/028 |
| | | | | 73/115.06 |
| 6,452,118 B1 * | 9/2002 | van Pinxteren | ........ | G01G 19/14 |
| | | | | 177/145 |
| 8,530,764 B2 | 9/2013 | Monti | | |
| 8,550,704 B2 * | 10/2013 | Norris | ................. | F16H 57/0408 |
| | | | | 374/45 |
| 8,716,608 B2 * | 5/2014 | Karlsson | ................ | G01G 15/00 |
| | | | | 177/1 |
| 2009/0178860 A1 * | 7/2009 | Edrich | ................. | G01G 19/005 |
| | | | | 177/145 |
| 2013/0206484 A1 | 8/2013 | Consoli et al. | | |

* cited by examiner

*Primary Examiner* — Peter Macchiarolo
*Assistant Examiner* — Natalie Huls
(74) *Attorney, Agent, or Firm* — Christopher G. Darrow; Darrow Mustafa PC

(57) ABSTRACT

Embodiments of systems and methods for confirming fluid fill in automobile subassemblies are described herein. Such systems can include a weigh station to determine if the assembled automobile differential is at an acceptable weight that is indicative of proper fluid fill. A method of detecting a fluid fill condition for an automobile subassembly can comprise transferring the subassembly to a weigh station, applying constraints configured to prevent removal of the subassembly from the weigh station, weighing the subassembly, and determining the fluid fill condition based on the weight of the subassembly.

20 Claims, 4 Drawing Sheets

AUTOMOBILE SUBASSEMBLY FLUID FILL CONFIRMATION

BACKGROUND OF THE DISCLOSURE

The present disclosure relates to automobile assembly processes, and more particularly to testing procedures for determining whether an automobile subassembly has been properly filled with fluid.

In the course of assembling an automobile, it is critical that certain mechanical components be filled with the appropriate fluids. One such component is the differential housing which requires fluid for both lubrication and cooling. If a vehicle leaves the factory with an unfilled or improperly filled differential, the omission may not be detected until after the vehicle is put into service and a failure of the component occurs.

SUMMARY OF THE DISCLOSURE

Embodiments of systems and methods for determining fluid fill conditions for automobile subassemblies are described herein. The determining of the fluid fill condition may be achieved through weighing each subassembly and comparing the weight against an acceptable value or range of values. A weigh station may be incorporated into a subassembly line to avoid excess time and labor from alternative inspections.

In one implementation, a method of detecting a fluid fill condition for an automobile subassembly may comprise transferring the subassembly to a weigh station, applying constraints configured to prevent removal of the subassembly from the weigh station, weighing the subassembly, and determining the fluid fill condition based on the weight of the subassembly.

In another implementation, a system is disclosed. Such a system for determining a fluid fill condition for an automobile subassembly may comprise a conveyor capable of transferring the subassembly to a weigh station, a weighing scale configured to weigh the subassembly at the weigh station, at least one constraint configured to prevent the subassembly from being removed from the weigh station, and a controller configured to determine the fluid fill condition based on the weight of the subassembly.

In yet another implementation, a method of determining a fluid fill condition for an automobile differential housing may comprise filling the differential housing with lubricating fluid, conveying the differential housing from a filling station to a weigh station, applying constraints configured to prevent the differential housing from being removed from the weigh station, weighing the differential housing, determining the fill condition based on the data relating to the weight of the differential housing and a stored standard, and releasing the constraints to allow the differential housing to be removed from the weigh station based on the fluid fill condition.

BRIEF DESCRIPTION OF THE DRAWINGS

The description herein makes reference to the accompanying drawings wherein like reference numerals refer to like parts throughout the several views, and wherein.

DETAILED DESCRIPTION

Described herein are systems and methods for checking and verifying fluid fill conditions in automobile subassemblies. While it is contemplated that such systems and methods can be applied to a variety of subassemblies, the disclosure may be described with respect to embodiments located at a pick station of an automobile differential subassembly line. A differential, as used herein, is a component that allows torque from an engine or motor to be applied two ways, such as to two wheels located on an axle.

Figure 1:
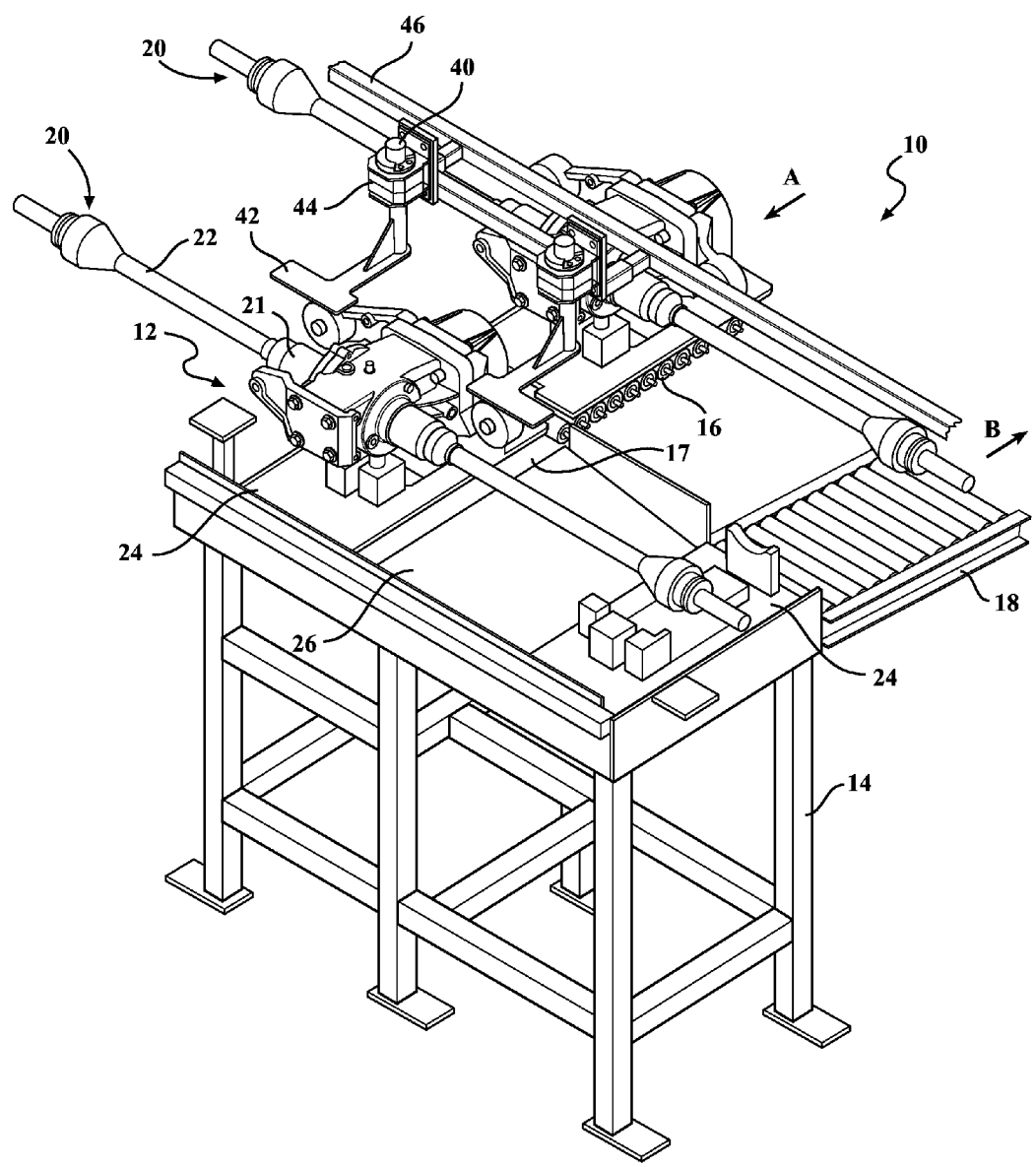
FIG. 1 is an isometric view of a pick station at a rear differential assembly line before integration into vehicle.

A differential assembly may be assembled at a variety of subassembly prep stations. As shown in FIG. 1, differential assembly 20 may comprise differential housing 21 that contains the differential gearing and wheel attachment members 22 that transfer torque and rotational movement to wheels of a vehicle. Assembly at prep stations can include mounting brackets to the differential assembly 20, filling housing 21 with fluid, checking the fluid level, and tightening a fluid cap. The fluid in differential assembly 20 is generally an oil, which provides wear resistance and heat transfer properties to the mechanical components located within differential housing 21. Several tests can be performed to check fluid level in differential housing 21, such as infrared sensing, ultrasonic scanning, and dipstick insertion, but such tests can be unreliable and can allow for fluid contamination. It is common for such tests to give false readings which can result in the bypassing of test results during assembly. Thus, it can be desirable to provide a system to verify that the correct amount of fluid is contained in the differential housing 21 after a fluid fill cap has been closed and prior to further assembly processes. Embodiments disclosed herein provide for systems and methods to determine a fluid fill condition of differential housing 21 by weighing differential assembly 20 and comparing weight data to acceptable values.

Figure 2:
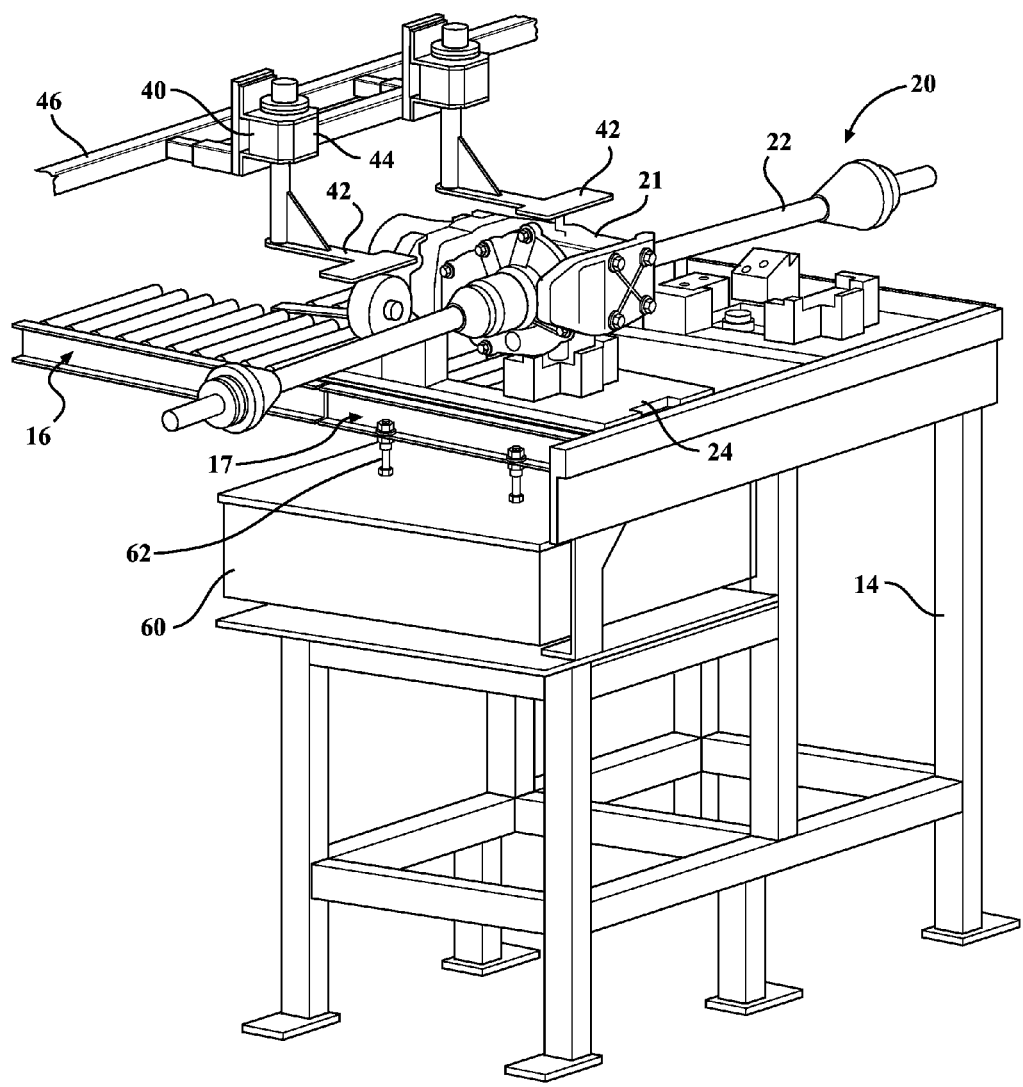
FIG. 2 is an alternate view of the pick station of FIG. 1.

Referring to FIGS. 1 and 2, upon completion at prior prep stations differential assemblies 20 are conveyed to pick station 10 of the differential subassembly line. It is at pick station 10 where differential assemblies 20 are collected to be transferred to another area for the next process in vehicle assembly. Pick station 10 may comprise base 14, incoming conveyor 16, and return conveyor 18. Differential assembly 20 may be positioned on transfer pallet 24 to allow easier conveyance. Subsequent to the removal of differential assembly 20 from pick station 10, transfer pallet 24 may be moved down transfer chute 26 and then down return conveyor 18 to be reused at the beginning of the subassembly line.

Differential assemblies 20 may be conveyed from prep stations via transfer pallet 24 on incoming conveyor 16 in the direction of arrow A depicted in FIG. 1. Incoming conveyor 16 may include a plurality of rollers as shown and may be angled at an orientation where incoming conveyor 16 is higher in a vertical direction at prior prep stations than at pick station 10. That is, transfer pallet 24 and differential assembly 20 can be moved with the assistance of gravity in direction A towards pick station 10. Additionally, a plurality of rollers on incoming conveyor 16 can be turned under power to assist in the conveyance of differential assembly 20 and transfer pallet 24. Differential assembly 20 can be removed from pick station 10 for further processing or installation into a vehicle by a robotic arm or an operator with a lift assist machine, and can be removed vertically from pick station 10.

After differential assembly 20 is removed from pick station 10 for further processes, transfer pallet 24 can be directed down transfer chute 26 to a return pallet position. Transfer pallet 24 can then be sent down return conveyor 18 in the direction of arrow B in FIG. 1, back towards prior prep stations such that the transfer pallet 24 can be reused for transferring additional subassemblies. Return conveyor 18 may be orientated on an incline away from pick station 10 and may include powered rollers to assist in the conveyance.

In embodiments disclosed herein, pick station 10 may include weigh station 12 where differential assembly 20 and transfer pallet 24 can be weighed. With reference to FIG. 2, weighing scale 60 is incorporated into pick station 10 at weigh station 12. Transfer pallet 24 can be conveyed to weigh station 12 along incoming conveyor 16 and onto weighing conveyor 17. This allows weigh station 12 to receive the differential assembly 20 without any extra transferring devices or added difficulty to an operator. Weighing conveyor 17 may be slightly separated from incoming conveyor 16 as shown such that transfer pallet 24 and differential assembly 20 rest on top of weighing conveyor 17 during a weighing process. Weighing conveyor 17 may be attached to scale 60 via scale attachments 62. Scale attachments 62 may be rigid and fixedly attached to scale 60 and weighing conveyor 17 or may be adjustable, for example, threaded fasteners that allow the height of weighing conveyor 17 to be adjusted. Scale 60 can weigh differential assembly 20 and transfer pallet 24 once the differential assembly 20 and transfer pallet 24 are in the weigh station position shown in FIG. 2. Scale 60 can be zeroed or tared in between the weighing of differential assemblies 20 to ensure the total weight of the differential assembly 20 and transfer pallet 24 are obtained for each subassembly.

Scale 60 may be a digital scale capable of sending a digital signal containing weight data to a scale controller. The scale controller (not pictured) may be incorporated within scale 60 or may be external to scale 60. The scale controller may comprise a processor, a microprocessor, minicomputer, or any other suitable device, including combinations and/or a plurality thereof. The scale controller can be in communication with a memory source having a value or range of values stored that are acceptable for proper fluid fill that is based upon the weight of differential assembly 20 filled with the proper volume of fluid. Thus, the scale controller can be calibrated to determine whether or not a weight signal from scale 60 is within an acceptable range for proper fluid fill. Furthermore, the scale controller may include logic that allows for the weight to stabilize after transfer so the final reading is not affected by vibrations induced by the moving subassembly. The scale controller may also include logic to zero the scale after a subassembly has been removed from weigh station 12. Scale 60 and/or the scale controller may be connected to a display device capable of providing feedback to a local or remote user. For example, the display can list the weight data collected by the scale and/or whether or not the weight is determined to be within an acceptable range. The scale controller may also engage or release constraints as further described below. It is contemplated that the scale controller may be integrated with a controller that implements other error or mistake proofing and poka-yoke devices throughout an assembly plant.

Figure 3A:
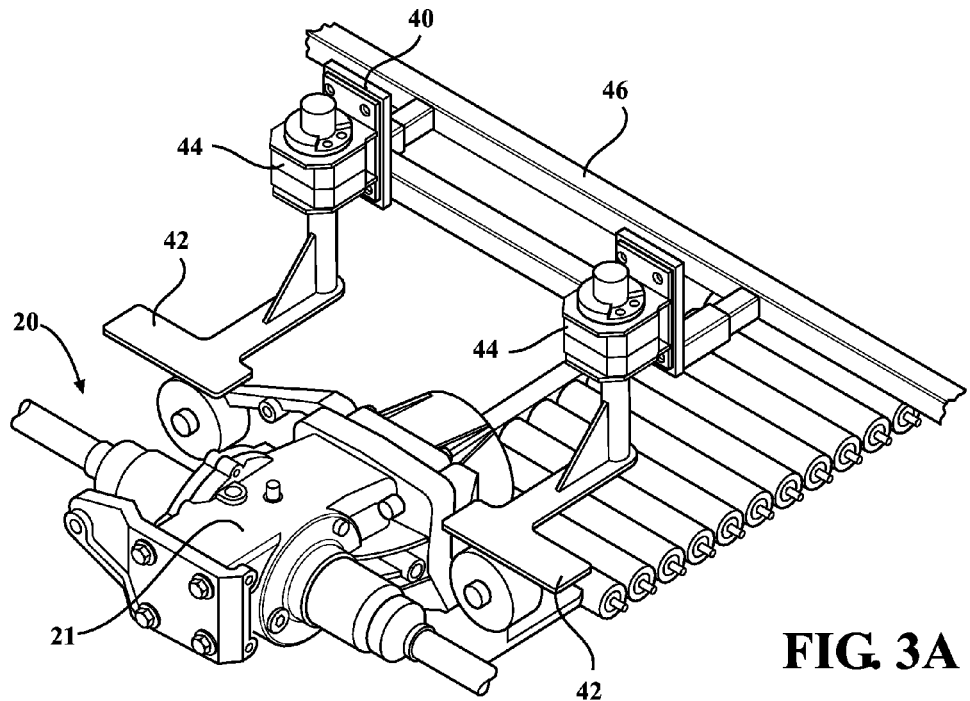
FIG. 3A is an isometric view of constraints in a closed position located at the pick station of FIGS. 1 and 2.
Figure 3B:
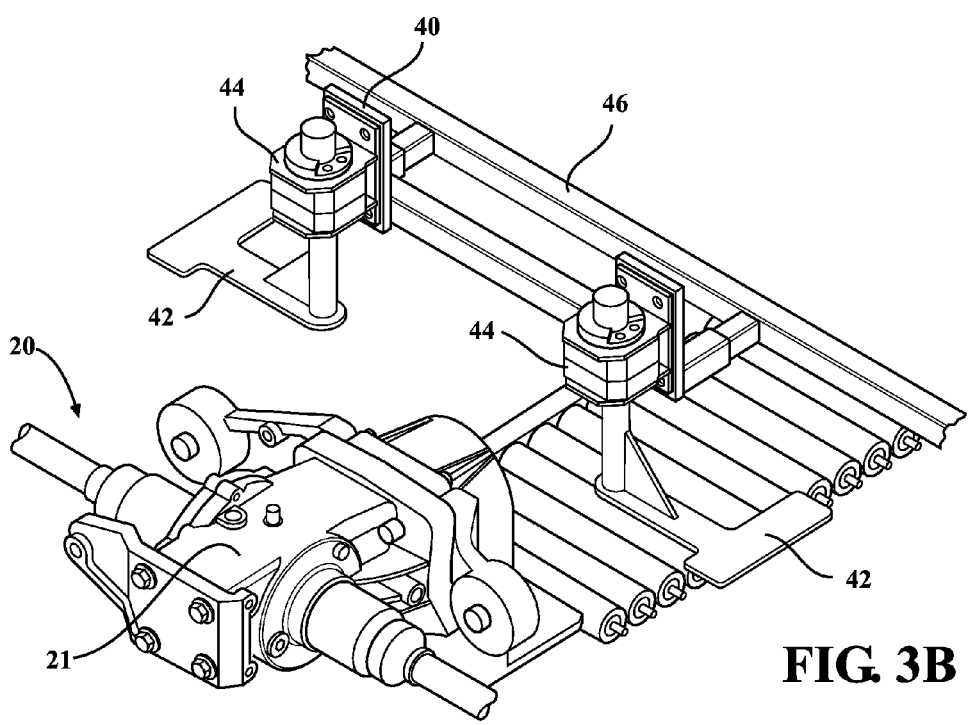
FIG. 3B is an isometric view of constraints in an open position located at the pick station of FIGS. 1 and 2.

The embodiments disclosed in the figures include constraints 40 to ensure differential assembly 20 is retained in weigh station 12 of pick station 10 for a period of time. Turning now to FIGS. 3A and 3B, constraints 40 can be further described. Constraints 40 may be configured to prevent a robotic arm or lift assist machine from removing differential assembly 20 prior to confirming proper fluid fill in differential housing 21. Constraints 40 in the figures include constraint arms 42, constraint actuators 44, and constraint support 46. Constraint support 46 may comprise a beam extending approximately horizontal and positioned vertically above weigh station 12 of pick station 10. Constraint arms 42 extend from constraint actuators 44 and are generally horizontal and "L" shaped, but several different shapes and orientations are contemplated. Constraint arms 42 may be shaped in any configuration to prevent a removal device from removing the differential assembly 20 from pick station 10. Constraint actuators 44 may be rotary actuators, such as electric motors, that turn constraint arms 42 upon a signal from a constraint controller (not pictured).

FIG. 3A depicts constraints 40 in a "closed" position, or one that prevents removal of the differential assembly 20. Constraint arms 42 generally extend in a direction toward an area directly above differential assembly 20. FIG. 3B shows constraints 40 in an "open" position, or a position in which the differential assembly 20 may be removed from pick station 10. In the open position, constraint arms 42 may be rotated by constraint actuators 44 to extend in a direction away from the area directly above differential assembly 20. The open position can allow for a removal device to secure differential assembly 20 and remove it for further processing or assembly. Constraints 40 may be engaged in a closed position prior to differential assembly 20 being conveyed to weigh station 12. Upon determination that the weight data is in an acceptable range by the scale controller, constraints 40 may be actuated to be positioned in the open position, and the differential assembly 20 can be removed. Constraints 40 can be actuated upon a signal from the constraint controller, which can either be the scale controller or a separate controller in communication with scale 60 and/or scale controller. Constraint controller may be integrated with a controller that implements other error or mistake proofing and poka-yoke devices throughout an assembly plant.

While constraints 40 in the embodiments of FIGS. 1-3 are shown as rotational constraints attached to constraint support 46, it is contemplated that a variety of constraint configurations can be used. For example, constraints 40 may be attached to base 14 of pick station 10. Additionally, constraints 40 may be rigid supports that move linearly to extend above a differential assembly 20 in the weigh station 12. Constraints 40 can also be applied to the removing device, such as a robot or assisted lift device, to prevent the device from attaching to differential assembly 20.

Figure 4:
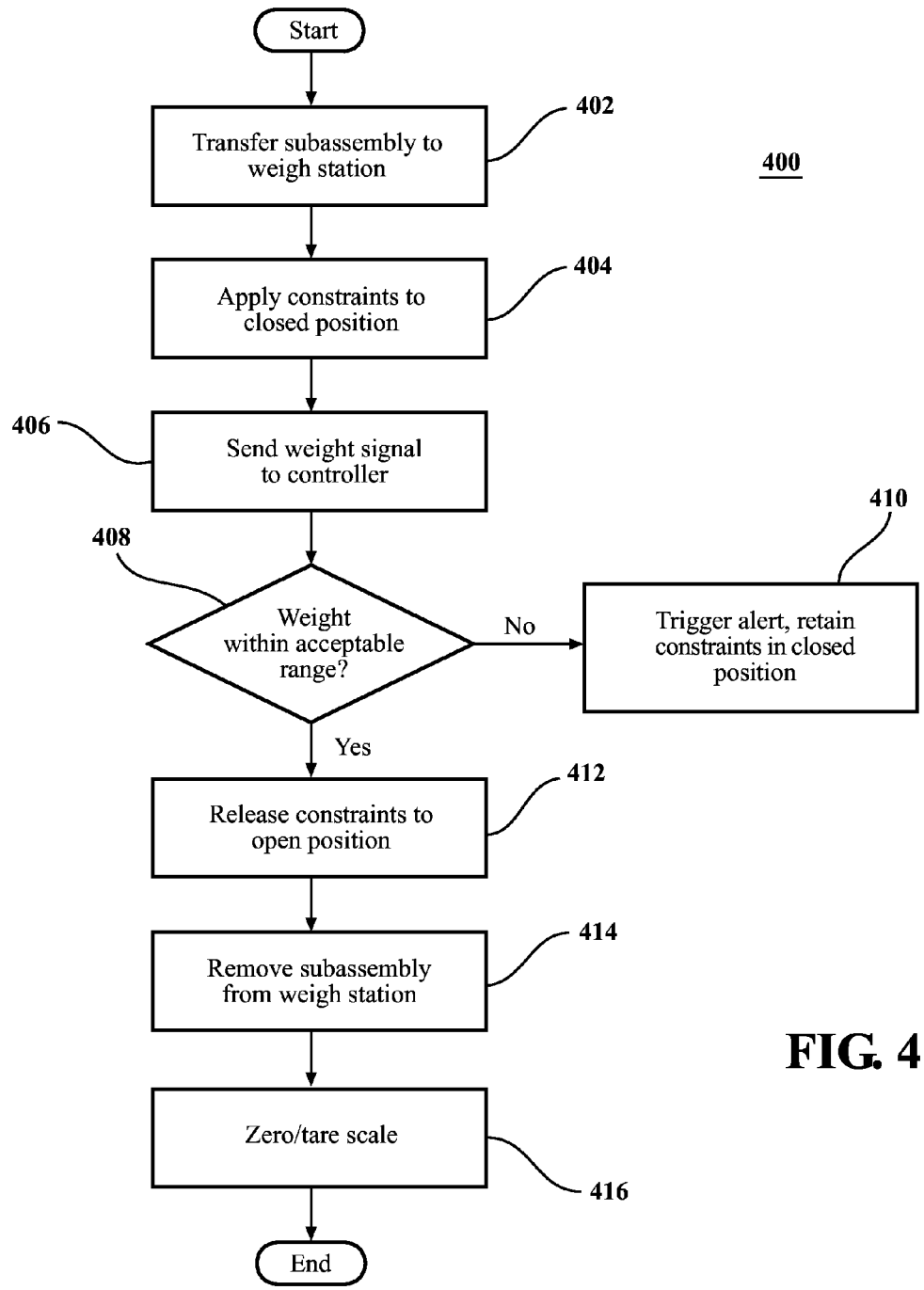
FIG. 4 is a flow diagram of a process for verifying fluid fill of an automobile subassembly.

A process or method for checking fluid fill in a subassembly is disclosed as process 400 depicted in flow diagram FIG. 4. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Beginning with step 402, a subassembly is transferred to a weigh station 12. As described previously, the subassembly may be a differential assembly 20 and may be transferred to weigh station 12 via transfer pallet 24. Constraints 40 are applied to a closed position in step 404, wherein constraints 40 prevent the subassembly from being removed from weigh station 12. As mentioned above, constraints 40 can be engaged prior to step 402, such that constraints 40 are in a closed position when the differential assembly 20 reaches weigh station 12.

A scale 60 weighs the subassembly and sends a signal indicative of the weight of the subassembly to a controller in step 406. The scale may be the digital scale 60 in FIG. 2, and the controller may be integrated in scale 60 or external and in communication with scale 60. Next, in step 408 it is determined whether the weight of the subassembly is within an acceptable range. If the weight is not within an acceptable range, an alert can be triggered in step 410, and the constraints 40 can be retained in the closed position until the problem is resolved. Alternatively, an operator can record any subassembly not falling within an acceptable range, add or remove fluid as necessary to remedy the problem, or move the subassembly to another area to be repaired. Data relating to the fill condition of each subassembly can be sent to external systems allowing for traceability of each subassembly throughout the assembly processes.

If the weight is determined to be within an acceptable range the constraints 40 are released to an open position in step 412. The subassembly can be removed from weigh station 12 in step 414, and scale 60 can be zeroed or tared in step 416.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of determining a fluid fill condition for an automobile subassembly comprising the steps of:
   transferring the subassembly to a weigh station;
   applying constraints configured to prevent removal of the subassembly from the weigh station;
   weighing the subassembly; and
   determining the fluid fill condition based on the weight of the subassembly.

2. The method of claim 1, wherein the automobile subassembly comprises a vehicle differential housing.

3. The method of claim 2, wherein the weigh station is located at a pick station of a differential subassembly line.

4. The method of claim 3, wherein the weigh station comprises a digital scale incorporated within the pick station.

5. The method of claim 2, wherein the transferring comprises moving the differential housing along a plurality of conveyor rollers.

6. The method of claim 1, wherein the fluid fill condition is determined using a calibrated controller in communication with the weigh station.

7. The method of claim 1, wherein the constraints are applied prior to the transferring of the subassembly, further comprising the step of removing the constraints subsequent to the determining of the fluid fill condition.

8. The method of claim 1, further comprising removing the constraints after the fluid fill condition is determined to be within an acceptable range.

9. The method of claim 1, wherein the applying of the constraints comprises rotating constraint arms to be positioned above the subassembly.

10. A system for determining a fluid fill condition for an automobile subassembly comprising:
    a conveyor capable of transferring the subassembly to a weigh station;
    a weighing scale configured to weigh the subassembly at the weigh station;
    at least one constraint configured to prevent the subassembly from being removed from the weigh station; and
    a controller configured to determine the fluid fill condition based on the weight of the subassembly.

11. The system of claim 10, wherein the automobile subassembly comprises a differential housing.

12. The system of claim 10, wherein the weigh station is located at a pick station of a differential subassembly line.

13. The system of claim 10, wherein the controller is configured to determine the fluid fill condition based on the weight of the automobile subassembly and a stored standard.

14. The system of claim 10, wherein the weighing scale comprises a digital scale capable of sending a signal to the controller.

15. The system of claim 10, wherein the at least one constraint comprises a constraint arm and a constraint actuator, wherein the constraint actuator is capable of rotating the constraint arm from an open position to a closed position.

16. A method of determining a fluid fill condition for an automobile differential housing comprising the steps of:
    filling the differential housing with lubricating fluid;
    conveying the differential housing from a filling station to a weigh station;
    applying constraints configured to prevent the differential housing from being removed from the weigh station;
    weighing the differential housing;
    determining the fluid fill condition based on the weight of the differential housing and a stored standard; and
    releasing the constraints to allow the differential housing to be removed from the weigh station based on the fluid fill condition.

17. The method of claim 16, wherein the weigh station is located at a pick station of a differential subassembly line.

18. The method of claim 16, wherein the applying of the constraints comprises rotating constraint arms to be positioned above the differential housing.

19. The method of claim 16, wherein the fill condition is determined using a calibrated controller in communication with a digital scale at the weigh station.

20. The method of claim 17, wherein the weigh station comprises a digital scale incorporated within the pick station.

* * * * *